(No Model.) 2 Sheets—Sheet 1.

E. R. DRAVER.
GRAIN SCOURING MACHINE.

No. 560,612. Patented May 19, 1896.

Witnesses:
E. F. Elmore
C. F. Kilgore

Inventor:
Emil R. Draver
By his Attorney
Jas. F. Williamson (No Model.) 2 Sheets—Sheet 2.
E. R. DRAVER.
GRAIN SCOURING MACHINE.
No. 560,612. Patented May 19, 1896.
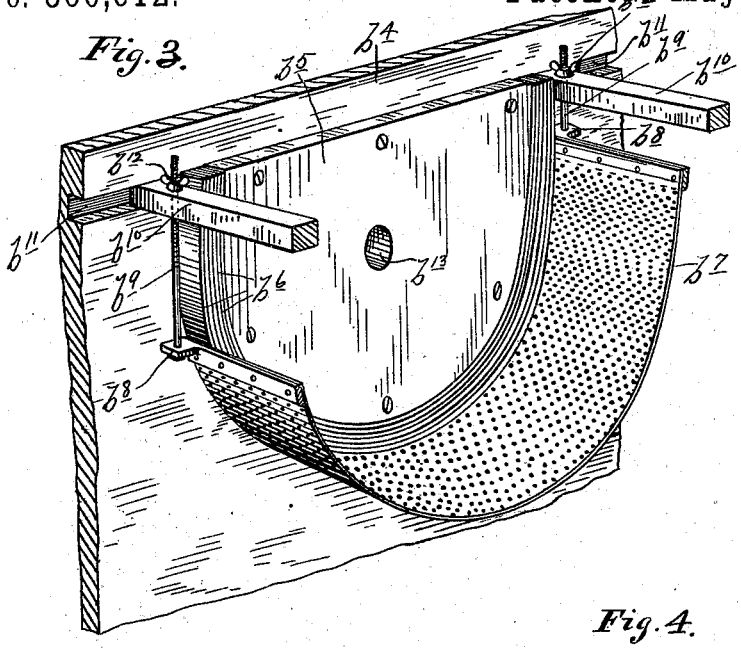
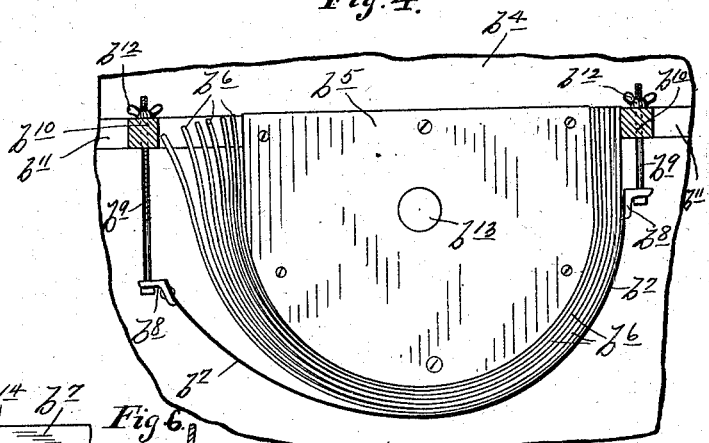
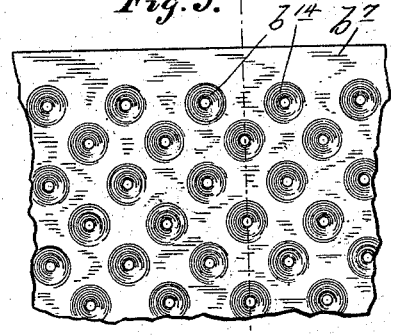
Witnesses:
E. F. Elmore
C. F. Kilgore
Inventor:
Emil R. Draver
By his Attorney
Jas. F. Williamson

UNITED STATES PATENT OFFICE.

EMIL R. DRAVER, OF ALLIANCE, NEBRASKA.

GRAIN-SCOURING MACHINE.

SPECIFICATION forming part of Letters Patent No. 560,612, dated May 19, 1896.

Application filed October 28, 1895. Serial No. 567,064. (No model.)

*To all whom it may concern:*

Be it known that I, EMIL R. DRAVER, a citizen of the United States, residing at Alliance, in the county of Boxbutte and State of Nebraska, have invented certain new and useful Improvements in Grain-Scouring Machines; and I do hereby declare the following to be a full, clear, and exact description of the invention, such as will enable others skilled in the art to which it appertains to make and use the same.

My invention has for its object to provide an improved scouring-machine especially designed for use in scouring grain, but also capable of application to other materials.

To this end my invention consists of the novel devices and combinations of devices hereinafter described, and defined in the claims.

The invention is illustrated in the accompanying drawings, wherein, like letters and figures referring to like parts—

Figure 1:
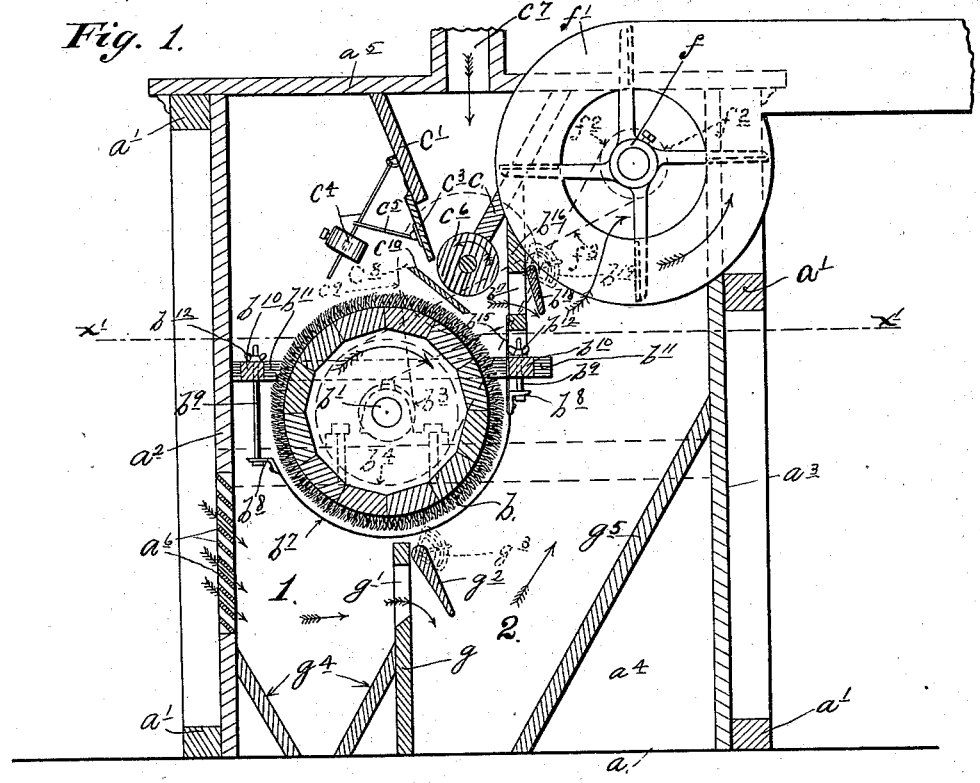
Figure 2:
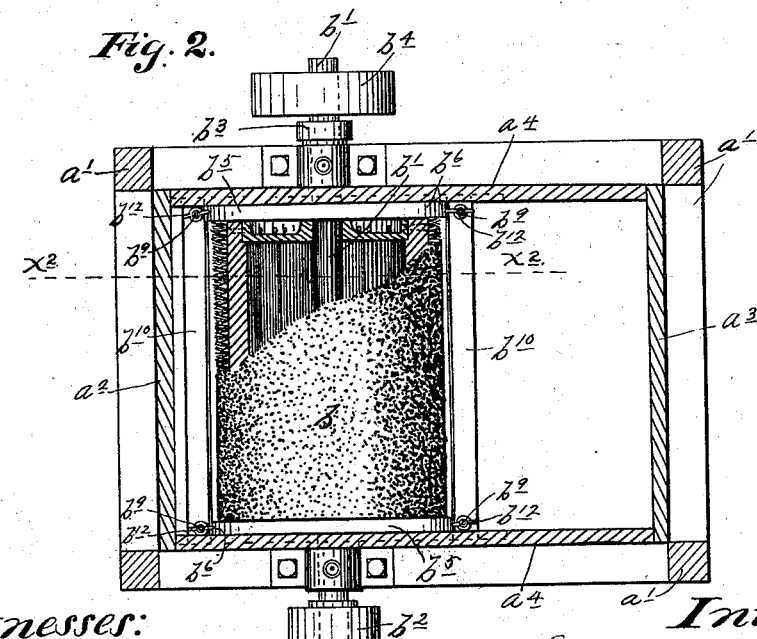

Figure 1 is a view, chiefly in central vertical section, from front to rear or left to right through the entire machine, but with some parts shown in elevation and with others broken away. Fig. 2 is a horizontal section on the line $x'\ x'$ of Fig. 1 with the brush shown partly in plan and partly broken away. Fig. 3 is a view in perspective of the parts which would appear on the section-line $x^2\ x^2$ of Fig. 2 with the brush removed and other parts broken away, looking outward. Fig. 4 is a true section on the line $x^2\ x^2$ of Fig. 2 with the brush removed, the concave loosened up at one end, and the spacing-strips spread apart at one end. Fig. 5 is an inside plan view of a part of the concave when spread out flatwise. Fig. 6 is a detail in section on the line $x^3\ x^3$ of Fig. 5.

$a$ represents the floor-line of a room in a mill or other building. $a'$ represents suitable framing-pieces, which, taken together with the front wall $a^2$, the rear wall $a^3$, end walls $a^4$, and top $a^5$, constitute a closed box or casing when set on the floor. Within the said casing forward of its center is mounted a cylindrical or drum-like brush $b$. The said brush $b$ is secured to a shaft $b'$, which is journaled in suitable bearings fixed to the frame-pieces and extends outward beyond the end walls $a^4$ of the casing. One end of the shaft $b'$ is provided with a pulley $b^2$ for the application of power thereto from any suitable source to drive the machine. The opposite end of the shaft $b'$ is provided with a small pulley $b^3$ and a large pulley $b^4$ for transmitting motion to other parts, as will presently appear.

To the inside surfaces of the end walls $a^4$ of the casing, directly opposite the brush-drum heads, are fixed a pair of spacing-heads $b^5$, with which coöperate a series of flexible spacing-strips $b^6$ to hold a concave $b^7$ at the proper radial distance from a common center concentric with the drum-like brush. The concave $b^7$ is provided with lugs $b^8$, which are engaged by draw-bolts $b^9$, passing through supporting-bars $b^{10}$, extending parallel with the axis of the brush-cylinder and working at their ends in grooves or guideways $b^{11}$, formed in the end walls $a^4$ of the casing. Thumb-nuts $b^{12}$ engage with the screw-threaded ends of the draw-bolts $b^9$ above the bars $b^{10}$ and serve as a means of drawing the concave $b^7$ tightly against the spacing-strips $b^6$ and the fixed spacing-heads $b^5$. The shaft $b'$ passes outward through holes $b^{13}$ in the spacing-heads $b^5$, and the parts of the said spacing-heads $b^5$ below the centers $b^{13}$ or the axial line of the shaft $b'$ are formed with peripheral portions, which are concentric with the brush drum or cylinder. The spacing-strips $b^6$ are made of material, such as hoop-iron or leather, which is sufficiently flexible to permit the same to readily conform to the shape of the spacing-heads $b^5$. Hence by interposing a suitable number of the said spacing-strips $b^6$ between the concave $b^7$ and the spacing-heads $b^5$ the said concave may be set at any desired radial distance from the axis of the brush-drum shaft, and be nevertheless always concentric with the brush-drum when drawn tightly against the spacing-strips $b^6$ and the heads $b^5$ by the draw-bolts $b^9$ and the nuts $b^{12}$. The fact that the bars $b^{10}$ are mounted in the grooves or guideways $b^{11}$ permits the same to be set nearer to or farther away from the spacing-heads $b^5$, as required, to bring the pulling strain from the bolts $b^9$ on the concave in the proper lines. When the machine is first built or a new brush is applied, spacing-strips $b^6$ will be used to the largest number. As the brush-filaments wear down at their ends, one after the other of the external spacing-strips $b^6$ will be removed from time to time and the concave be drawn inward, as required, to effect the necessary compensation. This construction therefore affords a means of effecting a relative radial adjustment of the concave and brush with respect to their common center whenever so required to compensate for the wearing down of the brush-filaments.

The concave $b^7$ is made of sheet metal, and its interior surface is provided with centrally-perforated concave pits or depressions $b^{14}$, as best shown in Figs. 3, 5, and 6. The depressions $b^{14}$ are staggered in respect to each other and serve as a means for up-ending and turning over the grain under the coöperation of the rotary brush. They also serve as a means for gathering and permitting the outward passage of the dust and dirt through the central perforations of the same under the action of the brush.

A piece of sheet metal $B^{15}$ depends from a partition-board $b^{16}$, with its lower edge overlapping the upper edge of the concave at the back of the brush. The partition $b^{16}$ extends to a junction with the rear wall $c$ of a feed-hopper, the forward wall $c'$ of which is cut away and is provided with a pivoted feed-door or section $c^3$, which is normally held in its most nearly closed position by a counterweighted lever $c^4$ and link $c^5$. A feed-roller $c^6$, journaled in suitable bearings fixed to the casing, coöperates with the door $c^3$ to form an automatic forced-feed device to deliver the grain in the properly-graduated quantities to the brush and concave. The grain is supplied to the feed-hopper through the supply-chute $c^7$ or in any other suitable way. One end of the feed-roller shaft $c^6$ projects through the casing and is provided with a suitable pulley $c^8$, which receives motion from the brush-shaft through a cross-belt $c^9$, engaging with the small pulley $b^3$, as shown in dotted lines in Fig. 1. An inclined board $c^{10}$ insures the proper delivery from the feed-roller $c^6$ to the brush and concave.

Directly rearward of the feed-hopper is located a fan $f f'$. The fan-shaft is provided with a pulley $f^2$, which receives motion from the rotary brush through a cross-belt $f^3$, engaging with the large pulley $b^4$ on the brush-shaft $b'$. The partition $b^{16}$ is provided with a passage $b^{17}$, controlled by a wind-board $b^{18}$, which is securable in any set position by any suitable locking device $g^3$. The front wall $a^2$ of the casing is provided with a lattice section $a^6$ below the brush-level.

The partition $g$ divides the lower part of the casing into a front compartment 1, the upper end of which is directly below the forward margin of the concave $b^7$, in position to catch the grain as it passes over the forward edge of the concave, under the action of the brush, and into a rear compartment 2 at the back of the brush and concave. The forward compartment 1 is shown as provided with inclined boards $g^4$, constituting a hopper-bottom, and the rear compartment 2 is shown as provided with an inclined board $g^5$, which serves both as a deflector for the forced current of air and as a collecting-surface for any sand or heavy dirt which may be brushed through the concave and not carried off by the forced current of air.

The brush, fan, and feed-roller rotate in the respective directions indicated by the arrows on the said respective parts. The brush is driven, preferably, at about two hundred and fifty revolutions per minute. The feed-roller moves relatively slow and the fan moves relatively fast—at, say, one thousand revolutions, or more, per minute, according to the amount of suction which it is desired to produce.

With the construction and arrangement of the parts hereinbefore described it is obvious that the grain as supplied with an automatic and graduated feed to the drum and concave will be subjected simultaneously to the scouring action of the brush against the concave as a bed and to the forced current of air drawn under and over and between the brush and the concave under the suction produced by the fan. As the grain passes the concave pits or depressions $b^{14}$ the kernels will be up-ended and turned over under the action of the brush. All sides of the kernels are therefore subjected to the scouring action of the brush, over and over again, throughout the entire course of the grain's travel from the receiving to the delivery side of the concave. The dust set free by the brush is gathered up and carried off by the forced current of air, through the fan and fan-case, to any desired point of delivery. The grain collected by the hopper-boards $g^4$ may be directed off therefrom through suitable spouting (not shown) to any point desired. By actual usage I have demonstrated the efficiency of this machine for scouring grain.

It will be understood of course that changes might be made in the details of the construction without departing from the spirit of my invention.

What I claim, and desire to secure by Letters Patent of the United States, is as follows:

1. The combination with a spacing-head and concave securable thereto, of one or more removable spacing-strips interposed between the peripheral margin of said head and the interior of said concave, whereby by varying the number or thickness of said spacing-strips said concave may be given radial adjustment concentric to said head, substantially as described.

2. The combination with a pair of spacing-heads and a concave secured thereto at its ends, of one or more spacing-strips interposed between the peripheral margins of said heads and the adjacent ends of said concave, whereby said concave may be given radial adjustment concentric to said heads, substantially as described.

3. The combination with the spacing-heads $b^5$ and the concave $b^7$, of the flexible spacing-strips $b^6$ interposed and clamped between the peripheral margins of said heads and the adjacent ends of said concave, whereby said concave may be given radial adjustment concentric to said heads, substantially as described.

4. The combination with the spacing-heads $b^5$ provided with fixed projections $b^{10}$, of the concave $b^7$ provided with perforated lugs $b^8$, the draw-bolts $b^9$ working through said lugs $b^8$ and projections $b^{10}$, the nuts $b^{12}$ on said draw-bolts, and the flexible spacing-strips interposed and removably clamped between the peripheral margins of said head and the ends of said concave, substantially as and for the purpose set forth.

In testimony whereof I affix my signature in presence of two witnesses.

EMIL R. DRAVER.

Witnesses:
  H. C. DRAVER,
  H. V. SCHAUPP.